United States Patent [19]

Jordan et al.

[11] 4,003,192
[45] Jan. 18, 1977

[54] TOBACCO HARVESTER DEFOLIATOR HEAD HAVING A POSITIVE STALK GRIPPING ASSEMBLY

[75] Inventors: Bertram Lee Jordan; John Davis Mitchell, both of Lewiston, N.C.

[73] Assignee: Harrington Manufacturing Company, Lewiston, N.C.

[22] Filed: May 20, 1975

[21] Appl. No.: 579,194

[52] U.S. Cl. .............................................. 56/27.5
[51] Int. Cl.² ...................................... A01D 45/16
[58] Field of Search .................. 56/27.5, 11.9, 10.2

[56] References Cited
UNITED STATES PATENTS

| | | | |
|---|---|---|---|
| 3,470,681 | 10/1969 | Saemann | 56/10.2 |
| 3,589,109 | 6/1971 | Payne | 56/10.2 |
| 3,601,959 | 8/1971 | Pinkham | 56/27.5 |
| 3,606,742 | 9/1971 | Wieneke | 56/10.2 |
| 3,609,947 | 10/1971 | Herbsthofer | 56/10.2 |
| 3,841,071 | 10/1974 | Pinkham | 56/27.5 |

*Primary Examiner*—Russell R. Kinsey
*Attorney, Agent, or Firm*—Mills & Coats

[57] ABSTRACT

The present invention relates to a defoliator head for a tobacco harvester in which the defoliator head is provided with a positive stalk gripping assembly for engaging and substantially encompassing respective tobacco stalks passing through the defoliator head during harvesting. The positive stalk gripping assembly comprises a pair of hydraulically driven belts disposed in side-by-side relationship so as to define a stalk passing area therebetween, and wherein at least one said belts includes a continuous series of outwardly projecting lugs disposed on the outside thereof. As the belts are driven, stalks entering therebetween are engaged and substantially encompass by the belts and successive lugs. Consequently, the stalks are stabilized and generally held in a firm upright position while the leaves are being defoliated therefrom by a defoliator mechanism associated with said defoliator head.

There is also provided a hydraulic speed control system that continuously effectively senses or monitors the ground speed of the harvester and drives the stalk gripping belts such that the horizontal rearward speed of the lugs is generally equal and opposite the harvester ground speed.

3 Claims, 4 Drawing Figures

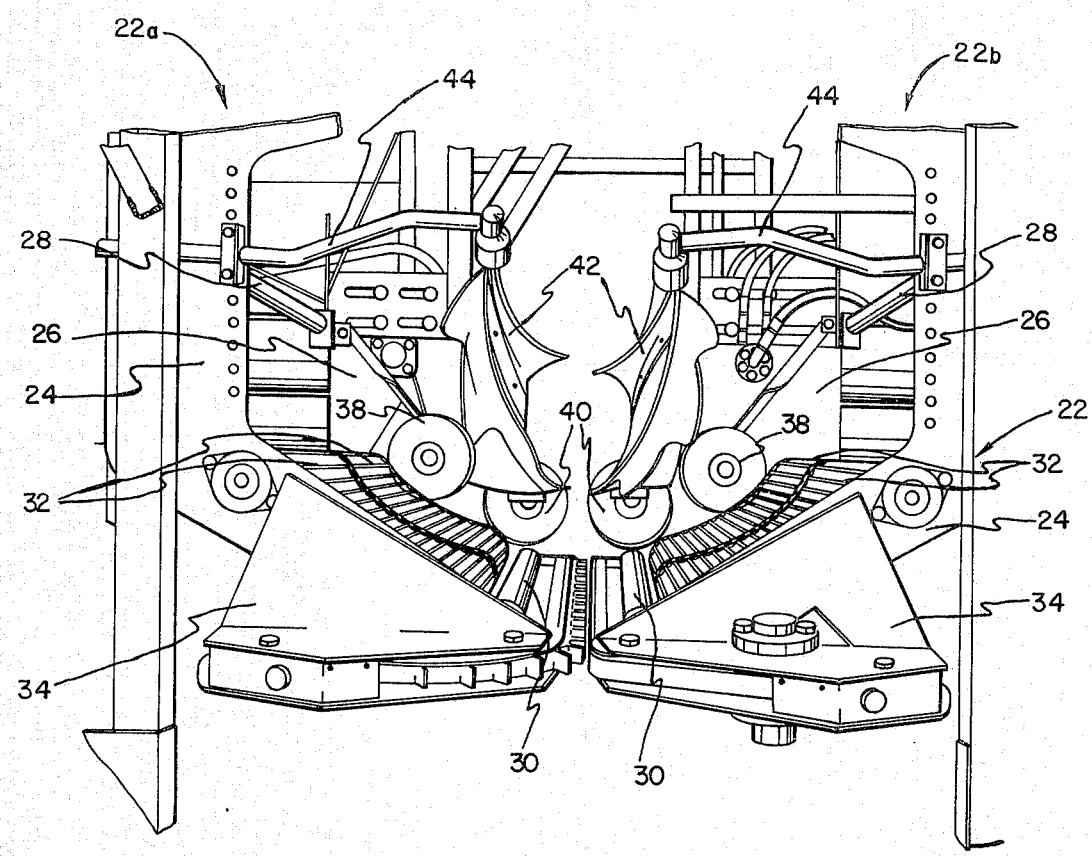
FIG. 2
FIG. 3
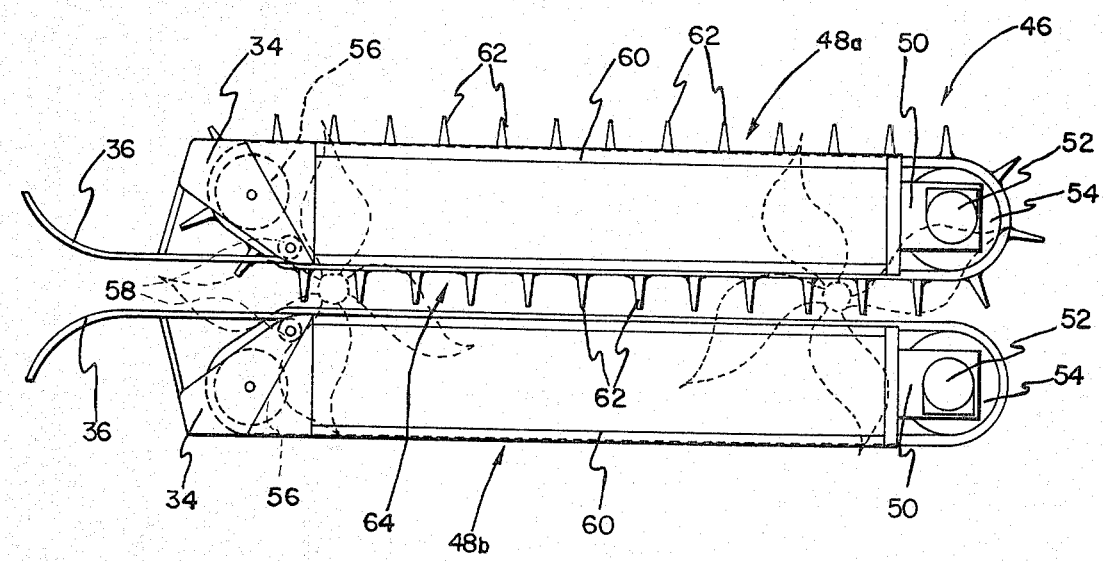

TOBACCO HARVESTER DEFOLIATOR HEAD HAVING A POSITIVE STALK GRIPPING ASSEMBLY

The present invention relates to tobacco harvesters, and more particularly to leaf defoliator heads therefor.

BACKGROUND OF THE INVENTION

With leaf defoliators, such as the rubber spiral type shown in U.S. Pat. No. 2,834,174, it is common for the tobacco stalks engaged thereby to bend and deflect during the harvesting operation. Sometimes the bending and deflection of the stalks actually results in the stalks being broken or severely damaged. But of equal concern, is that the effectiveness of the defoliators is impaired by the instability or movement of the stalks during defoliation, and the tobacco leaves are not cleanly defoliated from the stalk, and in some cases the leaves may not even be defoliated at all and consequently that portion of the tobacco crop is lost.

In an effort to stablize the stalks during defoliation, the disclosures in U.S. Pats. No. 3,507,103 and 3,841,071 have suggested the use of a pair of driven belts disposed in side-by-side relationship and placed below the defoliators for receiving the tobacco stalks therebetween and engaging such only on opposite sides with a gripping action. While such a stalk gripping design has been effective as far as lateral or side-to-side stability is concerned and has greatly contributed to the overall efficiency of automatic tobacco harvesting as we know it today, it still has been observed that some stalks, especially small and immature stalks, are not always completely stablized in the longitudinal direction between the driven belts. Consequently, in these cases, the efficiency and effectiveness of automatic leaf defoliation is not as good as when the stalk is completely stablized during the defoliating process.

Moreover, the spiral type leaf defoliator referred to above is driven such that the leaves are engaged generally about the upper sides thereof and the rotative action of the defoliators tend to break the leaves from the stalks and the leaves fall downwardly adjacent the stalks of tobacco being harvested. Below the defoliators on each side of the defoliator head is typically found a lateral conveyor assembly for conveying the defoliated leaves outwardly from the stalk row. Occasionally, however, tobacco leaves may fall between the lateral conveyor assemblies and between the stalk gripping belts, and in such cases, this part of the tobacco crop is lost unless picked up by hand.

SUMMARY OF THE INVENTION

The present invention entails a tobacco harvester header with a more positive stalk gripping assembly associated therewith. In particular, the stalk gripping assembly disclosed herein comprises a pair of driven belts disposed in side-by-side relationship so as to define a row passing area therebetween. Continuously secured to the outer side of at least one of the driven belts is a series of spaced apart outwardly projecting lugs that define stalk receiving areas therebetween. These outwardly projecting lugs cooperate or co-act with the adjacent driven belt to substantially encompass respective stalks passing between the belts and to project into the plane of the stalk row. It is, therefore, seen that the respective lugs tend to stablize the respective stalks in the longitudinal direction (as well as the lateral direction) between the two belts.

Because the outwardly projecting lugs do project into the plane of the tobacco stalk row, it is seen that the lugs and the two belts cooperate to substantially encompass each respective stalk passing therebetween. To avoid stalk damage, the present invention provides a hydraulic drive for a pair of belts and a hydraulic speed control system for driving the belts and the individual lugs at a horizontal linear speed generally equal and opposite the harvester ground speed. The net effect of such a speed control system is that the lugs move rearwardly with the stalks as the harvester moves forwardly through the field, the speed of the lugs (while projecting into the stalk row) being substantially equal and opposite the harvester ground speed such that the outwardly projecting lugs and the belts themselves co-act to substantially encompass each stalk and to stablize the same in both the transverse and longitudinal directions with respect to harvester travel during the defoliating operation.

For controlling the horizontal speed of the stalk gripping belts and the lugs carried thereby during the leaf defoliation process, the hydraulic speed control system is adapted to effectively sense or monitor the harvester ground speed continuously, and to drive the stalk gripping belts and the lugs carried thereby at a speed generally equal and opposite the sensed harvester speed.

It is, therefore, an object of the present invention to provide a tobacco harvester header having a positive stalk gripping assembly associated therewith for stablizing the respective stalks passing through the defoliator head in both the lateral and longitudinal directions.

A further object of the present invention is to provide a tobacco harvester header with a positive stalk gripping assembly for generally stablizing the stalks passing through the defoliator head and thereby increasing the effectiveness and efficiency of the defoliating operation.

Another object of the present invention is to provide a stalk gripping assembly for a tobacco harvester header having a pair of driven belts disposed in side-by-side relationship and defining a row passing area therebetween, wherein at least one of said belts is provided with a continuous series of outwardly projecting spaced apart lugs that generally cooperate and co-act with the other adjacent belt to substantially encompass and stablize respective stalks passing through the defoliator head.

A further object of the present invention is to provide a positive stalk gripping assembly for a defoliator head and a hydraulic drive and speed control system for driving stalk gripping belts of the stalk gripping assembly at a horizontal linear speed generally equal to and opposite the harvester ground speed.

Other objects and advantages of the present invention will become apparent and obvious from a study of the following description and the accompanying drawings which are merely illustrative of the present invention.

BRIEF DESCRIPTION OF THE DRAWINGS

FIG. 2 is a fragmentary front elevational view of a defoliator head for a tobacco harvester having the positive stalk gripping assembly of the present invention associated therewith.

FIG. 3 is a top plan view of the stalk gripping assembly of the present invention with portions of the defoliator head removed to better illustrate the structure thereof.

Figure 1:
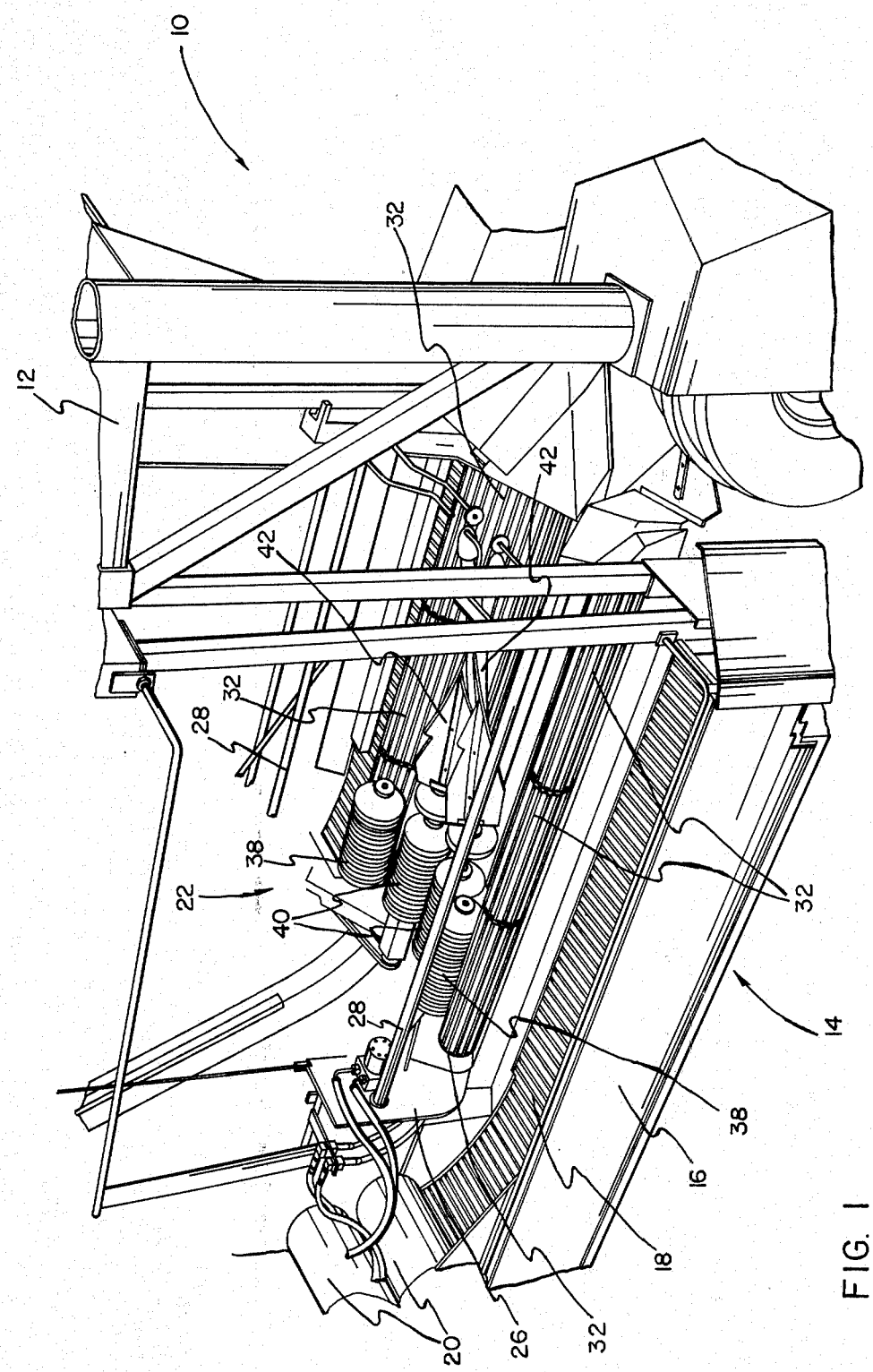
FIG. 1 is a fragmentary perspective view of a conventional high clearance tobacco harvester having a defoliator head mounted thereon.

With further reference to the drawings, particularly FIG. 1, there is shown therein a high clearance tobacco harvester that is generally indicated by the numeral 10. Briefly reviewing the basic structure of the tobacco harvester 10, as shown in FIG. 1, it is seen that the same includes a main frame 12 that is supported by ground engaging wheels (only one of which is shown), including a pair of rear hydraulically driven wheels (not shown).

Continuing to refer to the tobacco harvester 10, the same includes a longitudinal conveyor assembly, indicated generally by the numeral 14, disposed on each side thereof. Each of the longitudinal conveyor assemblies 14 include a vertical side wall 16 and a chain link conveyor assembly 18 disposed interiorly thereof. Defoliated tobacco leaves are received by the chain link conveyor 18 from the defoliator head (to be subsequently described herein) and are conveyed rearwardly and upwardly to where the tobacco leaves are discharged into a container or some other suitable receiving structure. In conveying the leaves upwardly, there is provided a series of spaced apart rollers 20 that cooperate with an upper run portion of the longitudinal conveyor assembly 14 in conveying the leaves upwardly and rearwardly. In particular, the individual tobacco leaves are conveyed between the chain link conveyor 18 and the respective rollers 20.

The above description is not a detailed description of the tobacco harvester 10 as the structure thereof is well known and appreciated by those skilled in the art. For a complete and unified understanding of the general conventional structure of such a high clearance tobacco harvester, one is referred to the disclosure in U.S. Pat. No. 3,841,071, this disclosure being expressly incorporated herein by reference.

For the purpose of defoliating tobacco leaves from respective tobacco stalks during the harvesting operation, the tobacco harvester 10 is provided with a defoliator head, indicated generally by the numeral 22. The defoliator head 22 shown in FIGS. 1 and 2 is of the spiral defoliator type and includes like left and right-hand defoliator frame assemblies 22a and 22b which are generally vertically adjustable by cables or the like to accommodate various levels of priming. Again, the defoliator head 22 is generally of a conventional design and well known in the art, but for the sake of understanding the present invention, it is thought to be of benefit to review the basic structure thereof. Because the left and right-hand defoliator frame assemblies 22a and 22b are alike, the following discussion may make reference to a particular structural component on one side of the defoliator frame assembly which will also be generally found on the opposite side defoliator frame assembly and in the same general location relative to the other elements of the defoliator. Each respective defoliator frame assembly includes a front frame member 24 and a rear frame member 26. Extending between respective frame members 24 and 26 and connected therebetween is a longitudinal connecting rod 28. Also, extending between the respective front and rear frame members 24 and 26 is a roller 30 that is appropriately driven such that the defoliated leaves falling thereon are conveyed or induced outwardly therefrom to an adjacently disposed series of chain conveyor assemblies 32. The chain conveyor assemblies 32 are driven such that the upper run of each moves outwardly relative to the respective adjacent ground roller 30, thereby resulting in the defoliated tobacco leaves being conveyed outwardly from the row opening area between the left and right-hand defoliator frame assemblies 22a and 22b onto the longitudinal conveyor assembly 14 on the respective sides of the tobacco harvester 10 where the tobacco leaves are conveyed upwardly and rearwardly therefrom.

Disposed on the front end portions of the front frame members 24 is a nose cone 34 that includes a stalk or row guide arm assembly 36 that tends to guide or channel the row of tobacco being harvested between the two left and right-hand defoliator frame assemblies 22a and 22b.

Turning now to the actual structure of the defoliator head 22 that functions to defoliate the tobacco leaves, it is seen that the defoliator head 22 includes inner scavenger assemblies 38 and outer scavenger assemblies 40. The particular function of these scavengers are well known in the art and are described in the disclosure of U.S. Pat. No. 3,841,071 already incorporated herein by reference.

Disposed above the row opening area between the left and right-hand defoliator frame assemblies 22a and 22b of the defoliator head 22 is a pair of laterally spaced inclined spiral type defoliators 42. The rear end of each of the spiral defoliators 42 is operatively connected to a driven shaft about a front portion of a respective inner scavenger and extends generally upwardly and forwardly therefrom where the front end thereof is rotatively held by an adjustable front arm 44 that extends inwardly from the respective front frame members 24 of the defoliator head 22.

Figure 4:
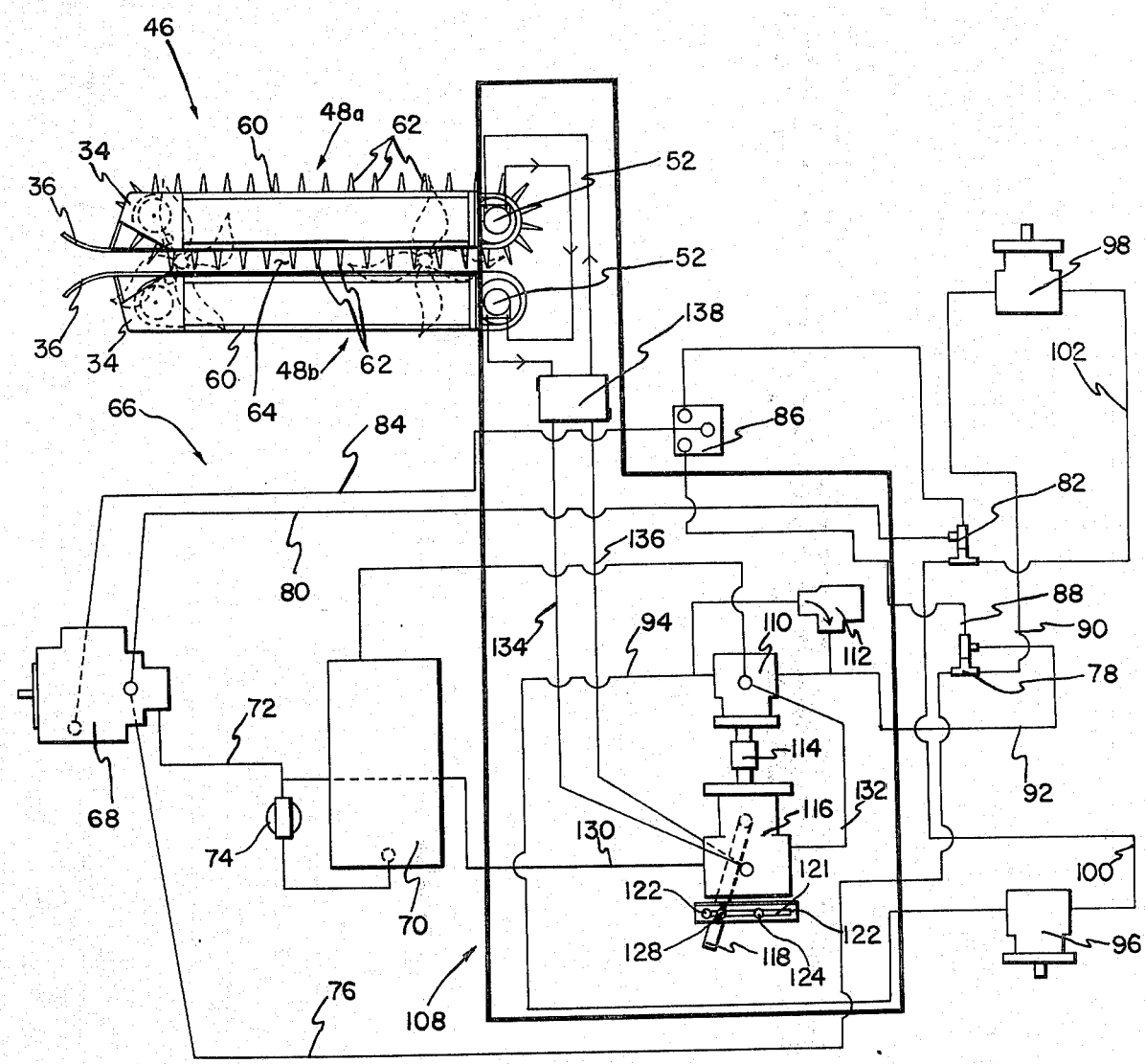
FIG. 4 is a schematic diagram illustrating the hydraulic speed control system for driving the stalk gripping assembly of the present invention.

Disposed about the lower portion of the defoliator head 22 is the positive stalk gripping assembly of the present invention, the positive stalk gripping assembly being indicated generally by the numeral 46 and particularly shown in FIGS. 2-4. Viewing the positive stalk gripping assembly 46 in detail, it is seen that the same includes left and right belt drive assemblies 48a and 48b. There is provided an extension plate 50 fixed to the rear defoliator frame member 26 and extending therefrom for supporting a hydraulic drive motor 52. Operatively connected to a shaft extending from each hydraulic drive motor 52 is a rear drive sheave or pulley 54. Rotatively mounted beneath the front nose cone 34 on each defoliator frame assembly is a pair of idler sheaves or pulleys 56 and 58, the front idler pulleys being referred to as an outer pulley or sheave 56 and an inner pulley or sheave 58.

Trained around the rear drive sheave or pulley 54 and the front idler pulleys 56 and 58 on each respective side of the defoliator head 22 is a drive belt 60. The belt 60 on at least one side of the defoliator head includes a series of spaced apart projecting means in the form of lugs 62 which extend outwardly from the outside of the particular belt 60. The lugs 62 (which may be in the form of rubber members vulcanized on the belt, metal projections, or other suitable material) are particularly spaced such that the area between successive lugs 62 serve as stalk receiving areas, and the area between the belts 60 is referred to as a stalk row receiving or passing area 64.

As indicated in FIG. 3, the stalk gripping assembly 46 essentially comprises the two belt drive assemblies 48a and 48b that are disposed in side-by-side relationship so as to define the row passing area 64 therebetween. It should be pointed out that the left and right-hand defoliator frame assemblies 22a and 22b are generally spaced such that the outer end of the respective lugs 62 terminate in close proximity to the outer edge of the other belt 60 along what is referred to as the inner longitudinal run of the respective belts or the stalk row passing area 64. This is particularly illustrated in FIG. 3 which shows two stalks of tobacco spaced apart and being substantially encompassed by the two belts 60 extending on the outer sides thereof and respective lugs 62 that project into the plane of the stalk row and particularly along the sides of the respective stalks. Therefore, it is appreciated that once the stalk is between at least two respective lugs 62 and the corresponding two belts 60, that the stalk is essentially stablized in all directions and the cooperation of the belts and the lugs 62 assures that the stalks are generally stablized as they pass between the defoliators 42 during the defoliating operation. In particular, the lugs 62 generally prohibit the stalks from moving longitudinally within the defoliator head and by the term longitudinally, it is meant from left to right, or right to left as viewed in FIG. 3. It is also appreciated that the presence of the belts 60 generally prohibit the stalks from moving laterally during the same defoliating operation.

Heretobefore tobacco harvesters have been provided with a pair of side-by-side disposed belts, sometimes referred to as ground drive belts, in which case the belts function to grip the stalks of tobacco on each side.

In this type of stalk gripping design, there were no structural elements that projected into the plane of the row and consequently, especially with small stalks, there was little if any control in the longitudinal direction between the defoliators 42. Also, it should be pointed out that with the belts engaging the outer edges of the stalk and no elements actually penetrating into the plane of the stalk row, it was not critical to control the speed of the stalk gripping assembly with respect to the ground speed of the tobacco harvester.

In the case of the positive stalk gripping assembly 46 of the present invention, because of the presence of the lugs 62 in the stalk row passing area 64, it is important to be able to continuously control the speed of each respective lug as they move from the front idler 58 to the rear drive sheave 54 in relationship to the ground speed of the tobacco harvester 10 as it moves through the field during the harvesting operation. Otherwise, it is clear that if the speed between the lugs and the harvester ground speed is not synchronized, but the lugs will break and damage the stalks passing through the defoliator head during the defoliating operation.

Therefore, the present invention shows in FIG. 4 a hydraulic speed control system for controlling the horizontal rearward speed of the lugs moving along the longitudinal run (i.e., from the front idler pulley 58 to the rear sheave 54) in stalk row passing area 64 in accordance with the ground speed of the tobacco harvester irrespective of changes therein during the harvesting operation. More particularly, the hydraulic speed control system of the present invention is effective to sense or monitor harvester ground speed continuously and automatically during the harvesting operation and to drive the hydraulic motors 52 of the positive stalk gripping assembly at a certain speed in response to the sensed or monitored harvester ground speed. Expressed in another way, the hydraulic speed control system is adapted and designed such that the speed of the lugs 62 during the harvesting operation, and while they project into the plane of the stalk row and cooperate with the respective belts 60 to substantially encompass the stalks passing therethrough, generally equals and is opposite the ground speed of the harvester 10. Consequently then, it is seen that respective successive lugs encompassing a stalk of tobacco move rearwardly with the stalk while the same is being operated on by the defoliators 42 and act to stablize the stalk during the process.

The following description will describe the hydraulic speed control system and the manner in which the same functions to continuously control the speed of the lugs 62 and consequently the drive belts 60 of the stalk gripping assembly 46.

With reference to the hydraulic schematic drawing of FIG. 4, it is seen that the same depicts and shows a hydraulic wheel drive system indicated generally by the numeral 66 that is adapted to drive, either forwardly or rearwardly, a pair of rear wheels (not shown) that support the harvester 10. Viewing the hydraulic wheel drive system in detail, it is seen that the same includes a variable displacement hydro-static transmission 68 of the common and well known type used in hydro-static drive systems for vehicles, particularly agricultural machinery. From a reservoir 70 there extends a fluid inlet line 72 that is connected to hydro-static transmission 68 and includes a filter 74 connected therein. Leading from the hydro-static transmission 68 is three basic fluid lines, fluid line 76 which leads to a double tee assembly 78, fluid line 80 which leads to a second double tee assembly 82, and fluid line 84 which leads to a motor block valve 86.

From the double tee assembly 78 there is connected a line 88 which leads to the motor block valve 86. Also, extending from the double tee assembly 78 is a fluid line 90 that is operatively connected to a hydraulic wheel drive motor 98 that is of conventional design and adapted to drive the right-hand rear wheel of the harvester 10, the particular right-hand reference based on standing at the rear and facing the harvester. Connected to the other side of the right-hand hydraulic wheel motor 98 is a fluid line 102 which extends back around and connects with the double tee assembly 82.

In addition, from double tee assembly 78, there is provided fluid line 92 which is operatively connected to a hydraulic drive motor 110 of the hydraulic defoliator speed control system shown herein and which will be discussed in greater detail subsequently herein. From the other side of the hydraulic motor 110, a line 94 extends and connects to a left-hand hydraulic wheel drive motor 96. Operatively connected to the other side of hydraulic wheel drive motor 96 is fluid line 100 which extends around to join the double tee assembly 82.

Operatively associated and integrated into the hydraulic wheel drive system 66 is a hydraulic defoliator speed control system enclosed within the blocked area of FIG. 4 and indicated generally by the numeral 108. Referring to this hydraulic defoliator speed control system 108 in detail, is seen that the same comprises a hydraulic drive motor 110 operatively connected between fluid lines 92 and 94 and in series with wheel motor 96. In parallel with the hydraulic drive motor 110 is a check valve 112 that allows fluid flow to bypass motor 110 by flowing from line 94 to line 92.

The hydraulic drive motor 110 is drivingly connected to a variable displacement hydro-static or hydraulic pump 116 through an interconnecting drive coupling 114. By being of the variable displacement type, the volumetric output flow from the pump can be varied independently of the driven speed. Variable displacement hydraulic pump 116 is of a conventional design such as produced by Sunstrand Hydro-Transmission Division of Sunstrand Corporation, Ames, Iowa. Because the design structure of such a variable displacement hydro-static pump is well known in the art and is not particularly material per se to this invention, only the basic function of such pump will be described herein with emphasis on the functional aspects of the pump relative to the hydraulic speed control system 108. Nevertheless, the hydro-static pump 116 is operatively connected to a fluid line 130 which is in turn connected to line 72 and as such is operatively connected to the reservoir 70. Hydro-static pump 110 also has connected to one port therein a fluid exiting line 132 which is routed by the hydraulic drive motor 110 and back to reservoir 70.

Of prime importance insofar as the embodiment shown in FIG. 4 is concerned is that the hydro-static pump 116 is operative when driven by the hydraulic motor 110 to circulate or drive a system of fluid through lines 134 and 136, which as viewed in FIG. 4 is operatively connected to the cross-over relief valve 138 and in series to the hydraulic motors 52 which drives the belts 60. Thus, in essence, the hydro-static pump 116 is operative to drive and circulate a system of hydraulic fluid through lines 134 and 136 while being driven by the flow of fluid from line 130, through the pump, and out line 132. Because the hydraulic pump 116 is a variable displacement type, the volumetric flow of fluid within lines 134 and 136 can be varied, independently of driven speed, by adjusting the angle of the swashplate therein. To provide for this adjustment, a swashplate adjustment arm 118 is operatively connected to the swashplate and extends therefrom and outwardly under a flange 122 that is turned outwardly from a support plate (not shown) fixed to the end of the hydraulic pump 116. Formed in the flange 122 is an elongated slot 121 and there is provided a pair of adjustable stops 124 that are secured in the elongated slot at proper intervals. There is also provided a wing nut assembly 128 that extends through the elongated slot 121 and through the swashplate adjustment arm 118, and it follows that the swashplate arm can be held stationary with respect to the hydro-static pump 116 by tightening the wing nut assembly such that the adjustment arm 118 is held stationary with respect to the flange 122.

In operation, the hydro-static transmission 68, which is typically driven by an internal combustion engine mounted on the harvester, is actuated through a hydraulic servo-control (not shown) to provide fluid under pressure to either fluid lines 76 and 80. To move forwardly, the controls are so actuated that fluid under pressure is pumped through line 76, through double tee assembly 78 and into lines 90 and 92. From line 90, the fluid is pumped through the right-hand hydraulic wheel drive motor 98, causing the same to turn and to drive the wheel associated therewith, the fluid exiting the hydraulic wheel drive motor 98 through line 102, through double tee assembly 82 and back to the hydro-static transmission 68 via line 80.

To drive the left-hand hydraulic wheel drive 96, fluid from line 92 is pumped through the hydraulic drive motor 110 of the hydraulic speed control system 108, and on therethrough through line 94 into the left-hand hydraulic wheel drive motor 96. The flow of fluid through hydraulic wheel drive motor 96 causes the same to be turned and to accordingly drive the wheel associated therewith. Therefore, it is appreciated that as fluid flows from the hydro-static transmission 68 through line 76, that both hydraulic wheel drive motors 96 and 98 are driven. It should be pointed out that the fluid leaving the left-hand hydraulic wheel drive motor 96 exits through line 100, through doube tee assembly 82, and back to the hydro-static transmission 66 through line 132.

As the harvester 10 is propelled forwardly through the field, that fluid flowing through line 92 is required to move through the hydraulic motor 110 since the check valve 112 prohibits the fluid from by-passing the same. It is also appreciated that the hydraulic motor 110 is always driven at a speed proportional to the speed of the left-hand hydraulic wheel drive motor 96 and consequently, it can thusly be stated that the hydraulic drive motor 110 is always driven in proportion to the forward ground speed of the harvester 10 and thusly effectively senses and monitors harvester ground speed.

Because the hydraulic drive motor 110 is drivingly connected to the hydro-static variable displacement pump 116, it also follows that this pump is likewise driven in proportion to the forward ground speed of the harvester 10. By the nature of the variable displacement hydraulic pump 116, the volumetric output of the system circulating in lines 134 and 136 is proportional at all times to the driven speed of the hydraulic pump. Thus, it is appreciated that the hydraulic drive motors 52 are continuously driven at a speed proportional to the forward ground speed of the tobacco harvester, irrespective of changes in the harvester speed with time. Because the hydraulic motors 52 are always driven at a speed proportional to the forward ground speed of the harvester, it follows that the lugs 62 of the stalk gripping assembly 46 likewise driven continuously in proportion to the forward ground speed of the harvester 10.

To synchronize the stalk gripping assembly speed control system 108 to assure that the linear horizontal rearward speed of the lugs 62 as they move rearwardly during leaf defoliation is approximately equal to the forward ground speed of the harvester 10, the swashplate adjustment arm 118 is adjusted and set such that for any given harvester ground speed the volumetric output of the hydraulic pump 116 will be such that the horizontal speed of the lugs 62 will be generally equal and opposite the harvester ground speed. This particular output of the hydro-static pump 116 is set by adjusting one of the stops 124 and 126 to the proper position within the elongated opening 121 and then moving the swashplate adjustment arm 118 thereagainst where the wing nut assembly 182 is tightened thereagainst. The other stop, 124 or 126, is positioned to where there is no or relatively no fluid output and at this position, the tobacco harvester 10 can be driven from one field to another or along the highway without the stalk gripping assembly being driven.

Once the angle of the swashplate within the hydrostatic pump 116 has been properly set to completely synchronize the speed of the lugs 62 of the stalk gripping assembly 46, it follows that because of the particular relationship between the speed control system 108 and the hydraulic wheel drive system, that the rearward speed of the lugs as they move down the row opening area 64 is always maintained generally proportional to the harvester ground speed. Once the volumetric fluid output of the hydro-static transmission 116 has been adjusted to where the rearward horizontal speed of the lugs 62 equal or generally equal the harvester ground speed, it follows that a generally direct one-to-one proportional relationship will be maintained within the operative range of the hydraulic control system 108. Therefore, for a given change in harvester ground speed, the hydraulic control system 108 effectuates a corresponding change in the horizontal speed of the lugs 62 during leaf defoliation.

It should be noted that when the harvester is driven in the reverse direction that the fluid by-passes the hydraulic motor 110 through the check valve 112. In particularly, when driven rearwardly fluid from the main hydro-static transmission 66 enters lines 80 and moves through the double tee assembly 82. From the double tee assembly 82 fluid flows through lines 100 and 94, and around the hydraulic drive motor 110 through the check valve 112 and on through the double tee assembly 78 and back to the hydro-static transmission 66 via line 76.

In principle, the hydraulic speed control system 108 of the present invention has the capability to continuously effectively sense or monitor harvester ground speed, and to continuously drive the stalk gripping assembly 46 at a speed proportional to the effectively sensed or monitored ground speed, irrespective of changes in harvester ground speed. Within the purview of this control system principle, it is contemplated that an alternate design would entail the provision of a hydraulic pump directly driven by a wheel on the harvester or even indirectly driven by the wheel through a chain or the like, wherein the hydraulic pump would be operatively connected between a source of hydraulic fluid and the hydraulic drive motors 52. Consequently, in such an alternate design, the hydraulic pump either driven directly or indirectly by at least one wheel would effectively continuously sense or monitor ground speed and the stalk gripping assembly 46 would be driven in proportion to this effectively sensed or monitored ground speed.

Therefore, from the foregoing specification, it is seen that during the harvesting operation, the positive stalk gripping assembly 46 of the present invention substantially encompasses the respective tobacco stalks passing through the defoliator head 22 and stablizes the stalks in both the longitudinal and lateral directions as the tobacco leaves are defoliated from the stalks. Also, because of the hydraulic speed control system 108, the lugs 62 projecting into the plane of the stalk row, move rearwardly in unison with the respective stalks because the belts 60 of the stalk gripping assembly 46 are driven in accordance with the sensed or monitored ground speed of the harvester 10. Thus, the lugs 62 do not break or bend the stalks, but move therewith during the harvesting operation irrespective of changes in harvester ground speed. Finally the presence of the lugs 62, as viewed in FIG. 3, tends to close the gap between the left and right-hand defoliator frame assemblies 22a and 22b and accordingly tends to prevent defoliated leaves from dropping through the gap between the left and right-hand defoliator frame assemblies.

The terms "upper", "lower", "forward", "rearward", etc., have been used herein merely for the convenience of the foregoing specification and in the appended claims to describe the TOBACCO HARVESTER DEFOLIATOR HEAD HAVING A POSITIVE STALK GRIPPING ASSEMBLY and its parts as oriented in the drawings. It is to be understood, however, that these terms are in no way limiting to the invention since the TOBACCO HARVESTER DEFOLIATOR HEAD HAVING A POSITIVE STALK GRIPPING ASSEMBLY may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

We claim:
1. In an automatic tobacco harvester adapted to move through a tobacco field and harvest tobacco leaves from individual stalks of a tobacco row, a defoliator head assembly mounted on said harvester and carried thereby and comprising:
 a. a frame structure;
 b. defoliating means mounted on said frame structure for defoliating leaves from respective tobacco stalks of a row passing through a row opening defined between said defoliating means;
 c. conveying means operatively associated with said defoliator head assembly for conveying the defoliated leaves from the defoliator head assembly;
 d. stalk gripping means disposed below said defoliating means for engaging respective stalks as they pass through said defolitor means, said stalk gripping means including cooperative first and second driven belts disposed in side-by-side relationship wherein respective innermost segments of the belts are disposed adjacent each other where they cooperate to receive respective tobacco stalks therebetween, and wherein at least one of said driven belts includes projecting means in the form of a continuous series of spaced apart lugs disposed on the outer side thereof and particularly spaced to receive respective tobacco stalks therebetween as the stalks pass through said defoliating means such that the respective stalks are substantially encompassed by the innermost segment of said belts and respective lugs, whereby the projecting lugs generally co-act with said belts to generally stablize the stalks and prevent the stalks from moving back and forth longitudinally within said defoliator means;
 e. hydraulic drive means operatively connected to said stalk gripping means for driving the same; and
 f. hydraulic speed control means operatively connected to said hydraulic drive means for continuously effectively sensing the ground speed of said tobacco harvester and driving said stalk gripping means at a horizontal speed generally equal and opposite said tobacco harvester ground speed.

2. In an automatic tobacco harvester having a mobile frame adapted to move through a tobacco field, a defoliator head mounted on said mobile frame and including laterally spaced defoliating means defining a row opening therebetween, and conveying means disposed adjacent said defoliating means for receiving the tobacco leaves defoliated by said defoliating means and for conveying the defoliated leaves away from said defoliator head, the improvement comprising a positive stalk gripping and stablizing assembly associated with said defoliator head and a hydraulic speed control system therefor, said stalk gripping and stablizing assembly being disposed below said defoliating means and operative to grip and stablize respective stalks passing through said defoliator head during leaf defoliation while said speed control system controls the speed thereof, said positive stalk gripping and stablizing assembly and hydraulic speed control system comprising:

a. a pair of belts assemblies disposed in side-by-side relationship below said defoliating means, each belt being assembly including a belt around a plurality of spaced apart pulleys and including an innermost longitudinal run that extends adjacent the innermost longitudinal run of the adjacent belt so as to define a stalk row passing area between the innermost longitudinal runs of the two belts;

b. at least one of said belts including a continuous series of spaced apart outwardly projecting lugs secured to an outer portion thereof, said lugs being spaced apart so as to define stalk receiving areas therebetween along the stalk row passing area between the innermost longitudinal runs of the two belts, whereby as respective stalks pass between the two belts said outwardly projecting lugs project into the plane of the stalk row passing therethrough and the respective stalks are substantially encompassed by successive lugs and said belts;

c. hydraulic drive motor means operatively connected to said stalk gripping and stablizing assembly for driving said belts;

d. a hydraulic speed control system operatively connected to said hydraulic drive motor means for driving the same; and e. said hydraulic speed control system including a hydraulic speed control unit means for continuously effectively sensing the ground speed of said harvester and for driving the at least one belt with said lugs formed thereon at a linear horizontal speed generally equal and opposite said effectively sensed harvester ground speed such that respective lugs projecting adjacent respective stalks move therewith as the stalks pass between the two belts during the defoliating operation, wherein the respective lugs disposed on each side of any stalk tend to prevent the stalk from bending and moving longitudinally between the two belts and in so doing tend to stablize the respective stalks during the leaf defoliating process.

3. The positive stalk gripping and stablizing assembly and hydraulic speed control system for the automatic tobacco harvester of claim 2 wherein said hydraulic speed control unit of said hydraulic speed control system comprising:

1. a hydraulic drive motor operatively connected to a hydraulic wheel drive system that propells said tobacco harvester wherein said hydraulic drive motor is driven by said hydraulic wheel drive system only when the harvester is driven;

2. a hydraulic pump means operatively connected to said hydraulic drive motor and driven thereby only when said harvester is driven, said hydraulic pump means being also operatively connected to a source of hydraulic fluid and adapted when driven to produce an output flow of fluid out of an output port formed therein;

3. means interconnecting said output port of said hydraulic pump means with said hydraulic drive motor means operatively connected to said stalk gripping and stablizing assembly for driving said belts wherein the output fluid of said hydraulic pump means drives said hydraulic drive motor means which in turn drives said pair of belts; and 4. means for automatically varying and adjusting the speed of said belts such that the rearward speed of said projecting lugs is approximately equal to the forward ground speed of said harvester, said means for automatically varying and adjusting the speed of said belts including means for varying the fluid output of said hydraulic pump means independently of the driven speed thereof and consequently driving said belts at a speed that will result in a direct and approximate one-to-one speed relationship between the rearward speed of said lugs and the forward ground speed of said harvester.

* * * * *